K. I. LINDSTRÖM.
MILKING MACHINE.
APPLICATION FILED JAN. 28, 1914.
1,103,974.
Patented July 21, 1914.
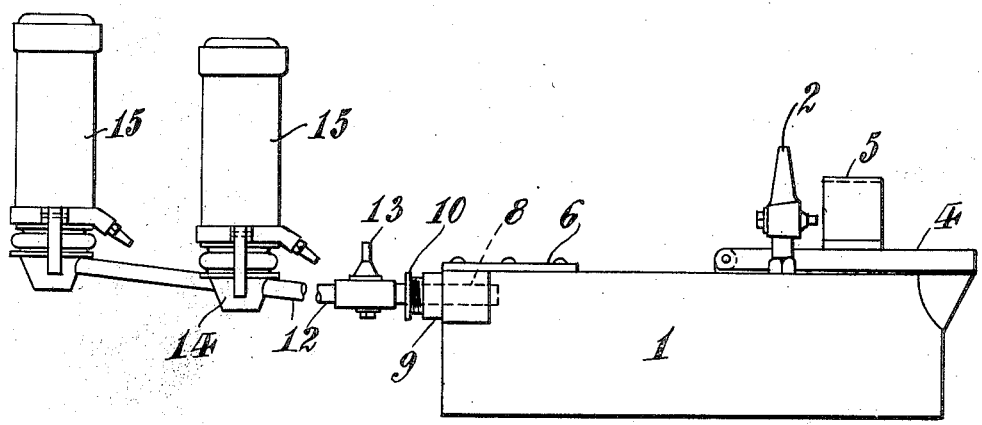
WITNESSES
INVENTOR
BY
ATTORNEY

UNITED STATES PATENT OFFICE.

KNUT IVAR LINDSTRÖM, OF VIBYNÄS, NYKVARN, SWEDEN, ASSIGNOR TO AKTIEBOLAGET MJÖLKNINGSMASKIN OMEGA, OF FLEN, SWEDEN.

MILKING-MACHINE.

1,103,974.      Specification of Letters Patent.      Patented July 21, 1914.

Application filed January 28, 1914. Serial No. 815,095.

*To all whom it may concern:*

Be it known that I, KNUT IVAR LINDSTRÖM, proprietor, a subject of the King of Sweden, residing at Vibynäs, Nykvarn, in the Kingdom of Sweden, have invented certain new and useful Improvements in Milking-Machines, of which the following is a specification.

The present invention relates to such milking machines for pressure or vacuum or both, as are provided with teat cups inclosing the teats, and as are further characterized by the fact, that the teat cups by means of inflexible tubes are adjustably connected with a milk collecting vessel, carried by the cow. In milking machines of the known types all such tubes have been made of metal. According to the present invention, on the contrary, the tubes between the teat cups and the milk receiver are made of a transparent, elastic material, for instance celluloid. By making these tubes or parts thereof for instance of celluloid, the advantage is obtained, that the milk flow in the tubes can be observed, and that thus no special devices for this purpose are necessary. Further the adjusting of the teat cups is facilitated on account of the elasticity of the tubes, and the weight of the whole machine will be diminished.

In the drawing which is a side view of a milking machine drawn in a conventional manner 1 is the receiver for the milk adapted to be connected with the suction conduit by means of the cock 2 and provided on its upper side with an air-tight lid 4 to which the pulsator (not shown) is secured by means of the bow 5. On the vertical part 8 of the frame 6, which part is turned toward the udder, are arranged four sockets 9, into which are screwed nuts 10. Through these nuts and corresponding openings in the frame pass pipes 12, each of which pipes is provided with a cock 13, the free end of each pipe terminating in a flanged cup 14. From the teat cups, in which by the pulsator above referred to, an intermittent vacuum and pressure is produced, the milk flows to the milk receiver 1 through the pipes 12, which, in this instance, are made of celluloid, or other suitable transparent elastic material, which allows the flow of the milk from the teat cups to the receiver 1 to be observed, so that a teat cup, as soon as the milk ceases to flow, can be at once removed.

The use of glass for the connecting tubes is expressly disclaimed.

I claim as my invention:

1. In a milking machine the combination with the milk receiver and the teat cups, of connecting tubes arranged between said cups and said receiver and made entirely of a transparent elastic material.

2. In a milking machine the combination with the milk receiver and the teat cups, of connecting tubes arranged between said cups and said receiver and made of celluloid.

In testimony whereof I have affixed my signature in presence of two witnesses.

KNUT IVAR LINDSTRÖM.

Witnesses:
  HARRY ATHLER,
  GRETA PRIEN.